United States Patent
Murgia et al.

(10) Patent No.: US 6,606,600 B1
(45) Date of Patent: Aug. 12, 2003

(54) SCALABLE SUBBAND AUDIO CODING, DECODING, AND TRANSCODING METHODS USING VECTOR QUANTIZATION

(75) Inventors: Carlo Murgia, Versailles (FR); Gaël Richard, Velizy (FR); Philipe Lockwood, Vaureal (FR)

(73) Assignee: Matra Nortel Communications, Quimper (FR)

( * ) Notice: Subject to any disclaimer, the term of this patent is extended or adjusted under 35 U.S.C. 154(b) by 0 days.

(21) Appl. No.: 09/528,777

(22) Filed: Mar. 17, 2000

(30) Foreign Application Priority Data

Mar. 17, 1999 (FR) .............................. 99 03323

(51) Int. Cl.$^7$ .............................................. G10L 19/02
(52) U.S. Cl. ........................ 704/500; 704/205; 704/268
(58) Field of Search ................................ 704/205, 268, 704/500

(56) References Cited

U.S. PATENT DOCUMENTS 4,790,016 A  12/1988  Mazor et al.
6,115,688 A  * 9/2000  Brandenburg et al. ....... 704/503
6,349,284 B1 * 2/2002  Park et al. ................... 704/500
6,369,722 B1 * 4/2002  Murgia et al. ................ 341/50
6,370,507 B1 * 4/2002  Grill et al. ................... 704/500

FOREIGN PATENT DOCUMENTS

| EP | 0 746 116 | 12/1996 | |
| EP | 0 942 411 A2 | * 9/1999 | ............. G10L/7/06 |
| FR | 2 766 032 | 1/1999 | |
| WO | WO97/21211 | 6/1997 | |

* cited by examiner

Primary Examiner—Talivaldis Ivars Smits
(74) Attorney, Agent, or Firm—Trop, Pruner & Hu, P.C.

(57) ABSTRACT

Using a group of spectral components from an audio signal, a coder produces a digital data stream ($\Phi$) including the quantification indices (QE0m) of at least some of the spectral components (E0m). The coder, or a transcoder situated downstream, selects at least one pair of components exhibiting a maximum correlation out of the group of spectral components, and includes in its digital output data stream identification information for each pair selected. At least some of the quantification indices are included in the output data stream for only one of the components for each pair selected. The decoder will use these to obtain the suppressed indices for the other component of the pair.

31 Claims, 8 Drawing Sheets

SCALABLE SUBBAND AUDIO CODING, DECODING, AND TRANSCODING METHODS USING VECTOR QUANTIZATION

This application is related to U.S. patent application Ser. No. 09/527,633, entitled "Coding, Decoding and Transcoding methods," which issued on Apr. 9, 2002 (U.S. Pat. No. 6,369,722).

BACKGROUND OF THE INVENTION

The present invention concerns the coding of audiofrequency signals, and more particularly coding, decoding and also transcoding methods based on a spectral decomposition of the signal. At least one part of such a codec operates on the spectral components of the signal, which could result from a decomposition into sub-bands or from a frequency transform (Fourrier transform, cosine transform . . . ). The present description of the invention will here below concentrate on, but will not be limited to, the context of a codec employing a decomposition into sub-bands.

The invention considers the problem of scalability of the digital data stream transmitted between a coder and a decoder. This property consists in the ability of the coder to construct variable rate output data streams on the basis of the same coding scheme applied to the coded digital signal, and in the corresponding ability of the decoder to reconstruct a faithful version of the signal.

The difficulty here is to serve the highest possible coding quality for each data rate value without unduly increasing the complexity of the circuits used.

Data stream scalability is of particular importance where the data stream is likely to be carried on packet switching networks, such as networks operating according to the IP (Internet Protocol). Historically, the majority of coders have been developed for broadcasting or communications applications in circuit mode, leading to fixed rate coders or coders with the rate selected from several possible values when the connection is set up. In the packet mode context, it is better that the rate should vary more dynamically, so that the data stream can be matched to the congestion encountered when the packets are conveyed while ensuring that the communication is maintained.

Patent application WO 97/21211 describes a multichannel audio signal coding system, the signal to be coded corresponding in fact to a group of five signals associated, respectively, with five channels, in which the signal associated with each channel is decomposed into thirty two sub-bands. A technique called joint frequency coding which relies on correlations that exist between different high-frequency channels, allows to reduce the total number of bits globally assigned to the coding of the higher frequency sub-bands, by considering that these sub-bands carry identical information for each channel so that it suffices to transmit this information only once. However, this technique does not allow the data transmission rate to be reduced for a single signal.

U.S. Pat. No. 4,790,016 describes a voice signal coding process in which the signal to be coded is sampled to produce n samples which are normalised and processed by a Fast Fourrier transform (FFT) to produce (n/2)+1 complex coefficients. Only certain coefficients are quantified and transmitted depending on the scale factor of the corresponding sub-bands, the coefficients of the sub-bands which are not transmitted being approximated at the receiver end by assigning to them the value of other sub-band coefficients which have been transmitted.

One of the main objectives of the present invention is to achieve a high degree of precision in the sampling capability of the digital signal, which will allow the best compromise in rate versus quality to be sought depending on the communication conditions.

SUMMARY OF THE INVENTION

A first embodiment of the invention thus relates to a method for the decoding of a digital data stream representing an audio signal, where at least one group of spectral components is calculated using the vector quantization index contained in the data stream, and the said group of spectral components are combined during the reconstruction of one version of the decoded audio signal, each component of the set being associated with a set of vector quantization indices used to calculate this component, and where the digital data stream includes an identification code for at least one pair of spectral components, each pair identified consisting of a first and a second component, and where the second component of at least one identified pair is associated with a set of vector quantization indices of which at least some are copied from a set of indices read from the data stream and which are associated with the first spectral component of the said identified pair.

This identification code is included in the digital data stream either by he coder generating the data signal, or by a transcoder which processes the signal between the coder and the decoder.

A second embodiment of the invention relates to a method for the decoding of a digital data stream representing an audio signal, in which at least one group of spectral components is calculated using the vector quantization index contained in the data stream, and the said group of spectral components are combined during the reconstruction of one version of the decoded audio signal, each component of the set being associated with a set of vector quantization indices used to calculate this component, where the digital data stream has a variable bit rate, and there is a first phase in which the digital signal carries respective sets of vector quantization indices for the calculation of a first group of spectral components and in which the correlations between spectral components of the first group are analysed, and a second phase, of lower frequency than the first, in which the digital signal carries respective sets of vector quantization indices for calculating one part only of the spectral components of the first group and where at least one spectral component of the first group not belonging to the said part is calculated from indices copied, at least partially, from a set of vector quantization indices read from the digital data stream and associated with a component belonging to the said part, for which a maximum correlation was determined in the first phase.

Thus, some of the spectral components can be calculated without the necessity of all the corresponding vector quantization indices appearing explicitly in the transmitted digital data stream.

If a reduction in digital bit rate is required, it is possible to omit from the transmission at least a part of the vector, quantization indices relative to one or more of the bands, while still conserving the relevant components, albeit with a reduced precision, in the reconstruction of the signal by the decoder, such that the loss of quality is limited.

These advantages make the process particularly suited to variable bit rate codecs. In addition, it allows a greater precision to be achieved in the permitted frequency variations. In one typical application of this embodiment the spectral components of the group are processed by sequential segments, each successive segment of a spectral component being determined from the product of a library waveform and a gain, the said waveform and said gain being identified by their respective vector quantization indices belonging to the associated set of indices. In this case, the vector quantization indices for a spectral component comprising the vector quantization indices of waveforms relevant to this spectral component could be copied, while the vector quantization indices of the corresponding gains could be read independently in the data stream.

A third embodiment of the present invention relates to a method for coding an audio signal, in which at least one group of spectral components is obtained from the audio signal itself, and a digital data stream, which includes the vector quantization indices of at least some of the spectral components, is generated at the output. According to the invention, at least one pair of components exhibiting maximum correlation out of the group of spectral components is selected, and an identification code for each pair of components selected is included in the digital output signal, at least some of the vector quantization indices being include in the output data stream for only one component of the pair of components selected.

In a corresponding manner, the invention process an audio coder consisting of a means of generating at least one group of spectral components from an audio signal, a means of calculating the vector quantization index of at least some of the spectral components of the group, a multiplexer producing a digital data stream output including at least some of the vector quantization indices calculated, and a means of analysis to select at least one pair of components out of the group of spectral components exhibiting a maximum correlation, the multiplexer being instructed to include an identification code for each pair of components selected in the data stream, and in such a manner that at least some of the vector quantization indices be included in the data stream output for only one of the component of each pair selected.

In one embodiment of the coder, a means of producing the group of spectral components from the audio signal comprises a bank of filters for the decomposition of the audio signal into frequency sub-bands.

In a variant of this, the means could consist of a first stage for coding the audio signal, and a bank of filters for the decomposition of a residual error signal produced by the first coder stage into sub-bands (see Patent application WO 99/03210).

It could also include a circuit to perform a frequency transform of at least a part of the signal.

The invention relates equally to transcoding processes which could be adapted to the coding and/or decoding processes described here below. The invention globally proposes a method for the transcoding of an input digital data stream, which represents an audio signal coded by successive time windows, in which a lower bit rate output data screen will be produced where, for a signal window represented by a number, A, of ordered bits, the output data stream is formed by a copy of a number (A–B) of input data bits with the suppression of a number, B, of input data bits in order to reduce the data rate, and where the bits to be suppressed from the input data stream are determined by information received from a decoder to which the digital output data stream is routed.

This transducing process, which serves to reduce the digital data rate, is not simply based on suppressing the last few bits of each time window, which is often not optimal, but is designed to limit the loss of quality, which is inherent in the reduction of the data rate, by making use of information received from the downstream data decoder.

In a similar manner to the coding process described here above, where the input digital signal contains sets of vector quantization indices associated with groups of spectral components, respectively, the transcoding process could consist of the following stages: select at least one pair of components exhibiting maximum correlation out of the whole group of spectral components, keep the set of vector quantization indices associated with one of the components of each pair selected, and suppress at least some of the indices from the set of vector quantization indices associated with the other component of each pair selected.

In a similar manner to the coding process described here above, where the input digital signal contains sets of quantification indices associated with groups of spectral components, respectively, the transcoding process could consist of the following stages: select at least one pair of components exhibiting maximum correlation out of the whole group of spectral components, keep the set of quantification indices associated with one of the components of each pair selected, and suppress at least some of the indices from the set of quantification indices associated with the other component of each pair selected.

Where the input digital signal carries sets of vector quantization indices associated, respectively, with groups of spectral components, another option is that the suppressed bits include at least one set of vector quantization indices associated with a spectral component.

In the latter case, the transcoding process operates simply by completely suppressing certain sub-bands.

The sub-bands to be suppressed can be determined by, and based on, the nature of the coded audio signal or by the properties of the decoder used to reconstitute it (for example, the audio signal bandwidth or bandwidth capability of the decoder).

They are in any case determined on the basis of information received from the decoder. In particular, in the above-mentioned case where a variable frequency decoder analyses a data stream at a relatively high bit rate looking for correlations between bands, the information thus obtained can be sent to the transcoder. In this way, the bands to be suppressed to achieve a reduction in bit rate can be chosen judiciously, that is in such a way that the audio signal reconstituted by the decoder using the index copy process will not be subject to an appreciable loss of quality.

In another embodiment of the transcoding process, the input digital data stream includes, for each time window of the signal, at least one index which will allow a coding parameter vector to be selected from a library containing $2^Q$ vectors which can be used to reconstitute a version of the decoded signal, the said index included in the input data stream consisting of (Q–q) bits which, with the addition of q arbitrary bits in predetermined positions, defines a set of $2^q$ vector addresses in the reference library, q being an integer such that q>0. In the output data stream, the (Q–q) bit index is replaced by a translated index composed of (Q–p) bits which, with the addition of p arbitrary bits in predetermined positions, defines a set of $2^p$ addresses containing the said set of $2^q$ addresses, p being an integer that q<p<Q. Thus, the transcoding process operates by the preferential suppression of the least significant bits for the vector quantization index, so that the impact of the reduction in the bit rate on the quality of the signal that the decoder can reconstitute is minimised.

BRIEF DESCRIPTION OF THE DRAWINGS

Other particularities and advantages of the present invention are presented here below in, but are not limited to, the following application examples described with reference to the attached figures, where.

DESCRIPTION OF THE PREFERRED EMBODIMENT

The invention described here below in, but is not limited to, its application to audio signal coding by a coder of the type described in patent application WO 99/03210, where several methods of applying the invention are illustrated. It will be self-evident that the invention is applicable to many other types of audio coding.

Figure 1:
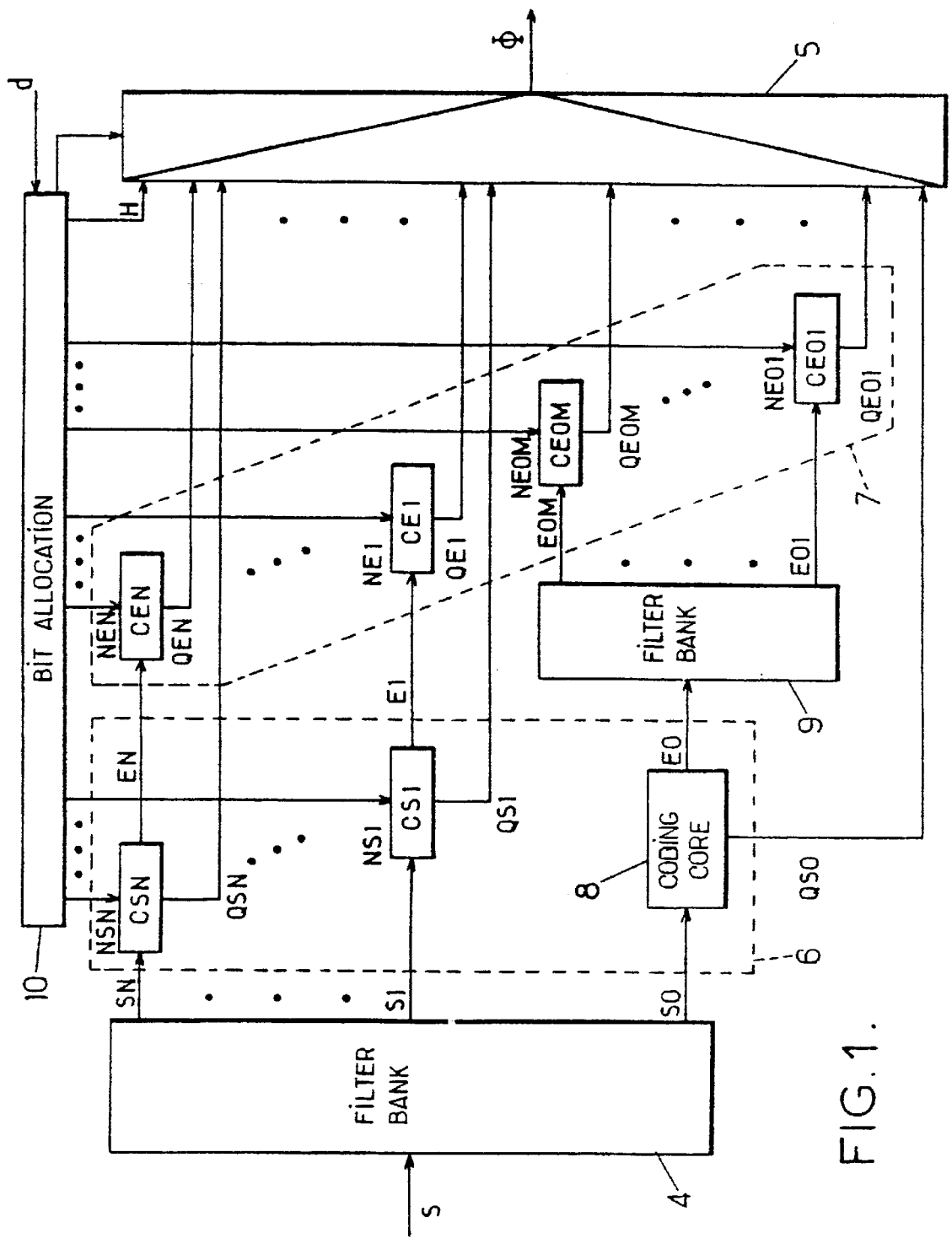
FIG. 1 is a schematic diagram of an example of an audio coder which can demonstrate the function of the invention.

The coder shown in FIG. 1 operates on the spectral components of the digital audio signal S to be coded which, in the case oriented, are obtained by separating the signal S into sub-bands by means of a bank filters 4 (in other embodiments, these might be spectral components obtained by Fourier transform or similar).

The input signal S is thus separated into a base signal S0 and a number N of high band signals S1–SN. The separation into sub-bands may be linear, each sub-band then having the same spectral width, or non-linear. In the latter case, the sub-bands may correspond to the Bark scale (see E. Zwicker et al. "Psychoacoustics, the ear as information receiver", Editions Masson, Paris, 1981). If the pass band of the input signal does not exceed 8 kHz, the use of a Bark scale in the bank of filters 4 does not appreciably improve the effectiveness of the coding, so that the greater complexity required by separation into sub-bands according to this scale may be dispensed with.

In order that the process of separation into sub-bands should not degrade the input signal, a bank of perfect reconstruction filters is used, consisting of example of QMF filters, or preferably filters separating into wavelets of 36 coefficients.

In the remainder of this description, it will be considered, though this is non-limiting, that the base signal S0 corresponds to a base band of 0 to 4 kHz and that the high band signals S1, S2, etc. correspond to the bands 4–5 kHz, 5–6 kHz, 6–7 kHz, 7–8 kHz, 8–10 kHz, 10–12 kHz, 12–14 kHz, 14–16 kHz, 16–20 kHz, 20–24 kHz and 24–32 kHz. This kind of increase in bandwidth may be seen as an approximation to the Bark scale which can be achieved with a bank of filters of reduced complexity. The list of the high bands given above corresponds to the case in which N=11 and is appropriate for an input signal with a pass band of up to 32 kHz (sampling frequency 64 kHz). For smaller pass bands, the number N is smaller, and only the first N bands of the list above are used.

Each of the high band signals S1–SN is submitted to a respective coding module CS1–CSN. Each coding modulus CSn ($1 \leq n \leq N$) operates vector quantization of the signal Sn which is submitted to it. This signal is broken up into successive segments formed of digital samples at a sampling rate lower than that of the input signal S. For each segment, the coder CSn selects a waveform from a predetermined library and a gain such that the estimated signal S'n constituted by this waveform multiplied by this gain shows a minimum difference from the signal Sn. This difference constitutes a quantization error signal, shown as En of FIG. 1 ($1 \leq n \leq N$). Vector quantization methods are well known in the field of audio signal processing (see N. Moreau, "Signal compression techniques", Editions Masson, CNET collection, Paris 1995). Over each time window constituted by one or more successive segments, the waveforms and gains selected are quantized over a number NSn of bits. These NSn bits form coding parameters QSn of the signal Sn which are supplied to the multiplexer 5 forming the output digital data stream Φ of the coder.

The coding modules CSn are part of a first coding stage 6. The coder in FIG. 1 comprises a second coding stage 7 including N modules CE1–CEN for vector quantization of the error signals E1–EN respectively delivered by the modules CS1–CSn in the first stage. Each module CEn ($1 \leq n \leq N$) performs vector quantization of the error signal En to produce coding parameters QEn, represented by NEn bits over each window, and which are supplied to the output multiplexer 5.

For the coding of the base signal S0, the fist stage 6 comprises a coding core 8 consisting of a standard coder. Examples of standard coders are the G.723 coder (see "Dual rate speech coder for multimedia communication transmitting at 5.3 and 6.3 kbits/s", Recommendation ITU-T G.723.1, March 1996), and the TETRA coder (see "Radio equipment and systems (RES), Trans-European Trunked Radio (TETRA), Speech codec for full-rate traffic channel, part 2: TETRA codec", ETSI Recommendation, Del ETS 300 395–2, December 1996). These examples of coders are analysis by synthesis speech coders, that is to say that they proceed by minimising an error signal E0 equal to the difference between the signal S0 supplied to the coding core and a synthetic signal S'0 constructed on the basis of the coding parameters QS0 selected. These parameters QS0 are supplied to the output multiplexer 5.

The error signal E0 is also available at the output of the coding core 8. This error signal is then submitted to another bank of filters 9 for separation into sub-bands.

The filter bank 9 is of the same type as the filter bank 4. It operates a linear separation of the signal E0 into M sub-bands. The number M is equal, say, to 8 which, in the example considered previously in which the base signal S0 is in the band 0–4 kHz, gives sub-bands with a width of 0.5 kHz (1 kHz sampling) at the output of the filter bank 9.

The M spectral components of the error signal E0 supplied by the bank of filters 9 are designated F01 to E0M.

Each of these components E0m (1≦m≦M) is submitted to a respective coding module CE0m belonging to the second stage 7 of the coder. These modules CE0m operate by vector quantization in the same way as the modules CEn described previously. The coding parameters delivered by the module CE0m have the notation QE0m and represent a number NE0m of bits per window which are supplied to the output multiplexer 5.

The numbers of bits NSn, NEn and NE0m are supplied to the different vector quantization modules by a bit allocation unit 10. This unit 10 also constructs a header H for the output data stream Φ of the coder. This header H describes the distribution of the bits in the digital data stream. The unit 10 also controls the multiplexer 5 to construct the data stream Φ.

Figure 2:
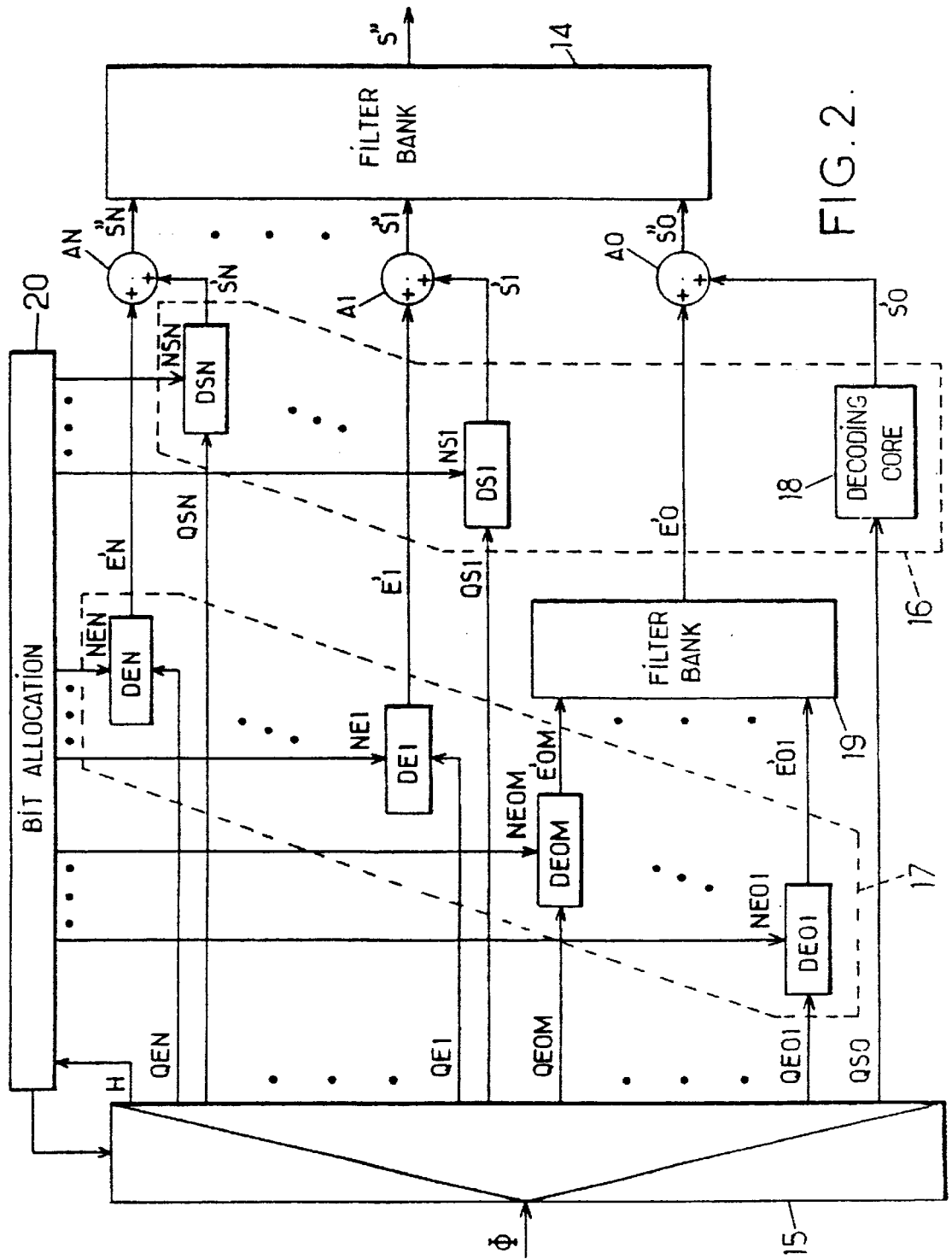
FIG. 2 is a schematic diagram of an associated decoder.

The dual decoder shown in FIG. 2 comprises a demultiplexer 15 receiving the data stream Φ from the coder. The demultiplexer 15 extracts the header H and the address to a bit allocation unit 20. The unit 20 then analyses the structure of the data stream and controls the demultiplexer 15 accordingly so that it delivers the relevant parameters for the different modules of the decoder.

The decoder comprises a set of modules 17 performing the reverse of the operations of the coding modules in the second stage 7 of the coder. The set 17 thus comprises N decoding modules DE1–DEN which reconstruct the estimates E'1–E'N of the error signals E1–EN, on the basis of the coding parameters QE1–QEN extracted by the demultiplexer 15. The set 17 also comprises M decoding modules DE01–DE0M which reconstruct the estimates E'01–E'0M of the components in sub-bands E01–E0M of the error signal E0, on the basis of the coding parameters QE01–QE0M extracted by that the multiplexer 15

A bank of recombining filters 19, corresponding to the bank of separation filters 9 of the coder, forms the estimate E'0 of the error signal E0 on the basis of the M estimation E'0m of its components in sub-bands.

Another set of modules 16 performs the decoding operations corresponding to the coding operations carried out in the first stage 6 of the coder. This set 16 comprises a decoding core 18 which is a standard decoder associated with the coding core 8. It reconstructs the synthetic signal S'0 of the analysis by synthesis coder on the basis of the coding parameters QS0 extracted by the demultiplexer 15. The set 16 also comprises N decoding modules DS1–DSN which reconstruct the estimates S'1–S'N of the high band signal S1–SN on the basis of the coding parameters QS1–QSN extracted by the demultiplexer 15.

N+1 adders A0–AN produce the N+1 improved estimates S"0–S"N of the spectral components of the input signal which are submitted to a bank of recombining filters 14. The adder An (0≦n≦N) performs the operation S"n=S'n+E'n. The bank of recombining filters 14 corresponds to the bank of separation filters 4 of the coder. It delivers the final estimate S" of the original audio signal.

The coder described above uses a main coding stage 6 and a stage 7 for enhancement by error quantization. Of course, it would be possible to provide other enhancement stages, a second improvement stage (that is to say a third stage of decoder) then performing vector quantization of the residual errors of the different coding modules in the second stage, and so on. Correspondingly, the associated decoder would then comprise other sets of decoding modules of the type in the set 17 shown in FIG. 2.

The method of bit allocation between the different coding modules depends on the application considered.

Bit allocation may be fixed, for example. Table I shows a numerical example of division of the output data stream binary rate between the different sub-bands and between the two stages of the coder (excluding the rate relating to the coding core). In this numerical example, N=4 and a base signal S0 in the band 0–4 kHz, sampled at 8 kHz, are chosen. The input signal S therefore has a pass band of 8 kHz. The coding core 8 is for example a G.723 coder which processes the signal in elementary frames of 30 ms (240 digital samples of the base signal). The vector quantization operations are performed on windows of 60 samples, each divided into four segments of 15 samples. The windows are of 60 ms (two elementary frames of the G.723 coder) for modules CE01–CE08, and of 30 ms (one elementary frame of the coding core) for modules CS1–CS4 and CE1–CE4.

For each window, the numbers of bits per sub-band are: NE0m=NSn=NEn=56 for 1≦n≦4, divided as follows:

- 6 scalar quantization bits GG of an average gain over the window;
- 6 vector quantization bits GR of four residual gains concerning the four segments of the windows respectively;
- 4×Q=40 bits IF constituting the waveform vector quantization indices, each index of Q=10 bits being the address, in the library of size $2^Q$=1024, of the waveform to be used for one of the segments; and
- 4 bits σ representing the signs allocated to the global gains (=average gain over the window+residual gains) relating to the four segments of the window.

TABLE I

| Sub-band (kHz) | 1st stage rate (kbit/s) | 2nd stage rate (kbit/s) | Total per sub-band (kbit/s) |
|---|---|---|---|
| 0–0.5 | — | 0.9333 | 0.9333 |
| 0.5–1 | — | 0.9333 | 0.9333 |
| 1–1.5 | — | 0.9333 | 0.9333 |
| 1.5–2 | — | 0.9333 | 0.9333 |
| 2–2.5 | — | 0.9333 | 0.9333 |
| 2.5–3 | — | 0.9333 | 0.9333 |
| 3–3.5 | — | 0.9333 | 0.9333 |
| 3.5–4 | — | 0.9333 | 0.9333 |
| 4–5 | 1.8667 | 1.8667 | 3.7333 |
| 5–6 | 1.8667 | 1.8667 | 3.7333 |
| 6–7 | 1.8667 | 1.8667 | 3.7333 |
| 7–8 | 1.8667 | 1.8667 | 3.7333 |
| TOTAL | 7.4667 | 14.9333 | 22.4 |

Bit allocation may also be changed as a function of the output rate σ of the coder, by adding or removing high frequency bands and/or improvement stages. This allows the coder to be matched to the decoder which will process its output data stream and to the pass band of the transmission channel. This is achieved very simply by cancelling some of the numbers of bits NEn, NSn or NE0m supplied to the coding modules.

Thus in the numerical example in Table 1 and with a coding core of type G.723, the coder may have a data rate range running from about 6.3 kbit/s to 28.7 kbit/s depending on the quality and/or the rate required. It will be noted that great flexibility and very fine adjustment is possible in matching the coder rate.

The allocation unit 10 may also examine the respective energies of signals E0m, Sn, CEn supplied to the coding modules in order not to transmit coding parameters of a signal which would be of negligible energy.

The coder may also be matched to different pass band widths and/or different sampling frequencies of the input signals S. For this, we can add high bands in the initial separation into sub-bands of signal S. The coding core used may itself be selected from among several standard coding cores (G.723, Tetra, MPEG-2, AAC etc.) provided in the audio coder, these different coding cores enabling signals of different pass bands and/or sampling frequencies to be processed.

When bit allocation is variable, it is necessary to include in the output data stream of the coder allocation bits indicating the sub-bands taken into consideration. These allocations bits may be placed in the header H of the data stream. They may also be placed with the corresponding quantization bits, as FIG. 3 shows.

Figure 3:
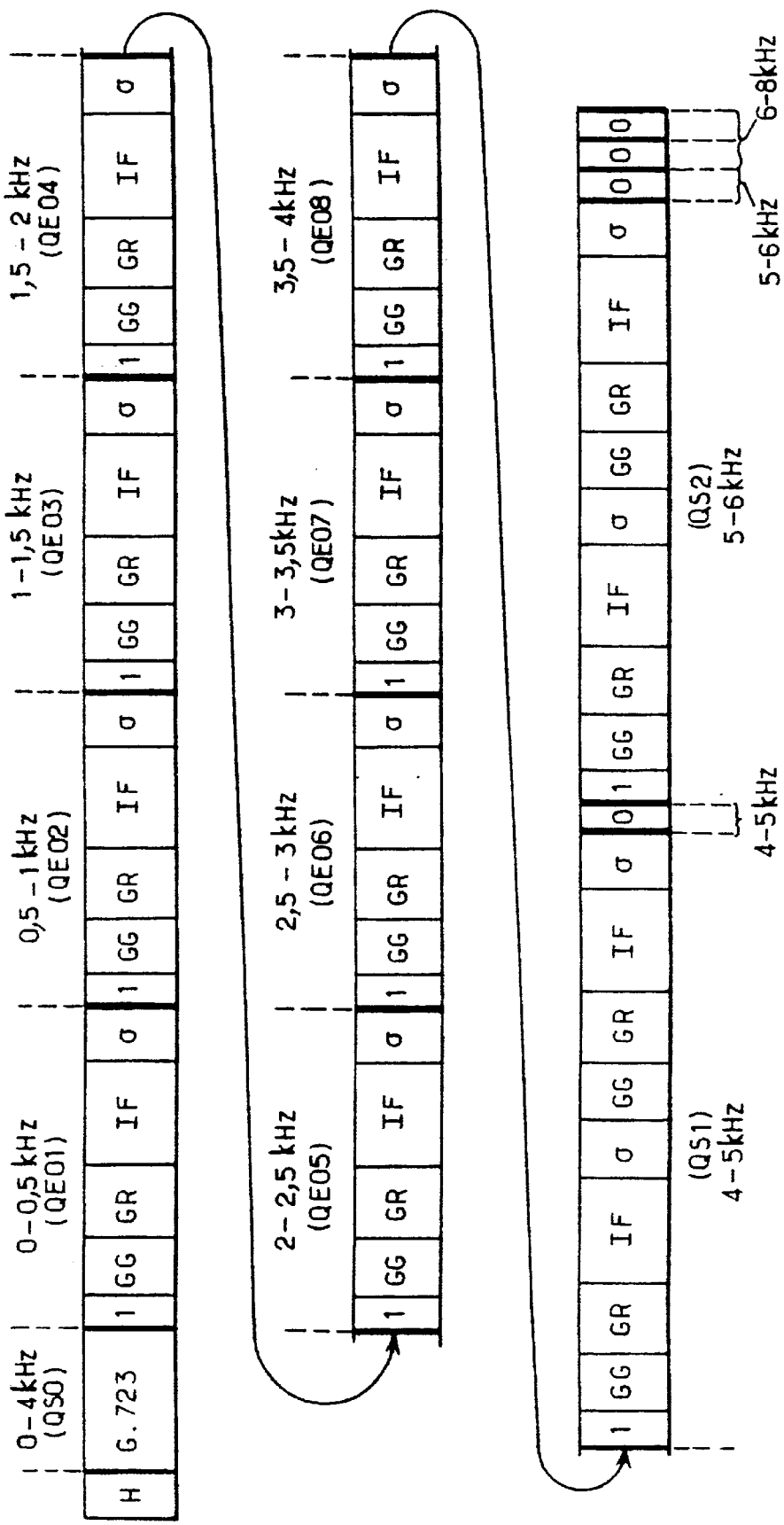
FIG. 3 is a diagram showing an example of a data stream structure which could be generated by the coder in FIG. 1.

The example in FIG. 3 corresponds to a particular case in which bit allocation is such that the M=8 sub-bands resulting from the separation of the residual error E0 of the coding core 8, assumed to be of type G.723 (frames of 30 ms, i.e. 240 samples at 8 kHz), are taken into consideration, as are the two lowest sub-bands among the N=4 high sub-bands resulting from the separation of the input signal S (cf. Table I).

The data stream shown in FIG. 3 corresponds to a time window of 60 ms. It is assumed that the coding process is in two stages, that is to say with a single enhancement stage. For example, the header H comprises four bits used to code the type of coding core used (G.723 at 6.3 kbits/s, G.723 at 5.3 kbit/s, Tetra, CELP VM at 5.5 kbit/s etc.), to which is added a bit indicating the input signal sampling frequency (8 kHz or 16 kHz).

After the header H are found the bits representing the parameters QS0 supplied by the coding core according to the standard format. In the example considered, the window includes two G.723 frames, forming the contribution to the data stream of the base band 0–4 kHz for the first stage of coding.

The G.723 parameters are followed by fields relating to the sub-bands coming from the separation of the error signal E0 of the coder core, considered in ascending frequency order. Each of these fields relates to the second stage of the coder, and starts with the allocation bit. If this allocation bit has the value 1 (for each of the eight sub-bands in the case considered), the data stream includes coding parameters QE0m for the sub-band, and the bits representing these parameters GG, GR, IF and σ follow the allocation bit, before moving to the next sub-band. If the allocation bit has the value 0, the sub-band concerned is not used, and the 0 allocation bit is directly followed by the field relating to the next sub-band.

After the fields relating to the M=8 sub bands of the error signal E0, the data stream comprises in succession the fields containing the information relating to the N−4 high bands of the input signal separation considered in ascending frequency order (these fields are absent if the header H indicates that the sample frequency is 8 kHz only). Each of these fields refers to the first stage and where applicable the second stage of the coder, and begins with an allocation bit. If this allocation bit has the value 0 (for the last two high bands in the case considered), the band concerned is not used, and the 0 allocation bit is followed directly to the field relating to the following band (it is not necessary to provide an additional allocation bit for the second stage). If the allocation bit has the value 1 (for the first two high bands in the case considered), the data stream includes two sets of coding parameters QSn of the first stage for the band in question, and the bits representing these parameters GG, GR, IF and σ follow the allocation bit (these are two sets of NS1=NS2=56 bits because the 60 sample quantization windows are of 30 ms only for the high bands); the data stream then comprises the additional allocation bit for the second stage which is followed in turn, where necessary, by the bits representing the coding parameters QEn relating to the second stage.

It will be noted that the format illustrated by FIG. 3 is suited to very varied contents of the data stream. It allows various coder cores to be taken into account, and very numerous possibilities in the allocation of the bits per sub-band, from which numerous possible rate values result. This data stream is known as "editable" insofar as it allows retrieval of the coded information piece by piece (band by band here). For example, if a decoder limited to a sampling frequency of 8 kHz receives the data stream shown in FIG. 3, which in principle is intended for a decoder operating at 16 kHz, it will nevertheless be able to reproduce a version of the coded audio signal simply by disregarding the information concerning the high bands.

With the values in Table I and a 6.3 kbit/s G.723 coding core, the data stream shown in FIG. 3 codes the 60 ms signal window into A=1069 ordered bits, corresponding to a rate of 17.8 kbit/s. If the input signal is sampled at 8 kHz only, the corresponding bit in the header is changed, and the information concerning the high bands is deleted (last line in FIG. 3): the window is then of A=839 ordered bits, corresponding to a rate of 14 kbit/s. If an additional reduction in rate is necessary, the simplest solution is to delete the highest sub-band or bands in the separation of the error signal, which entails a certain degradation of quality. For example, if the rate has to be reduced to 12.9 kbit/s, the two highest sub-bands are deleted.

In one mode of embodiment of the invention, a reduction in rate results from deletion applied to certain bits only of one or more vector quantization indices.

As an example, the waveform quantification indices IF are considered below. It will be noted however that a similar procedure could be applied to any parameter vector which the decoder can retrieve on the basis of vector quantization indices picking out from predetermined libraries. In particular, it could be applied to the stochastic excitation vector used in coders of the CELP type or similar.

For each segment of a signal E0m, Sn or En undergoing vector quantization, the coder is capable of producing the address, represented by an index IF of Q=10 bits (example in Table I) which designates in the reference library of $2^Q$ vectors the waveform of 60 samples considered as optimum in the sense of minimising the quantization error on a training corpus.

If only Q−p bits of this index IF ($1 \leq p < Q$) are transmitted to the decoder, this will know that the address of the vector selected by the coder is part of a group of $2^{Q-p}$ addresses represented by the different indices of Q bits which share the Q−p bits received. The coder will then be able either to choose one of the vectors picked out by the $2^{Q-p}$ addresses of the group, or to calculate an average to obtain the waveform used to reconstruct the signal.

More generally, the transmitted indices of Q−p bits are obtained by truncating p bits of determined positions in the indices of Q bits which correspond to the addresses of the reference library by an arbitrary permutation (known by the transmitter and the receiver) in the interval $[0, 2^Q]$. Without restricting generality, we may study the case in which the truncated bits are the last p (least significant) bits of the indices.

This truncating can be carried out either by the coder at the origin of the digital data stream Φ (then the allocation unit 10 only has to supply the relevant bit numbers to the coding modules CSn, CEn or CE0m), or by an intermediate transcoder receiving the original data stream Φ (or a data stream already transcoded) and transforming it into a lower rate data stream Φ'. Truncating is carried out for one or more of the quantization vectors, or indeed for all. The coder or transcoder which performs this may include in the digital data stream, for example in the headers H, information describing the changed structure of the data stream in terms of numbers of bits of the different indices, unless this information is already known by the decoder.

This method of proceeding secures a far finer rate adjustment than when only the number of sub-bands taken into consideration is adjusted.

The case considered first is one in which the permutation mentioned in the interval $[0, 2^Q]$ is identity, the non-truncated index being equal to the address of the vector selected by the coder. The contrary case, where a transcoding table or relation is used to give an account of the permutation, will be considered later.

It is possible to adopt appropriate ordering of the reference library to ensure that, for one or more values of the integer p the $2^P$ vectors designated by the addresses of the group are close to each other in the sense of a distance criterion, so as to minimise the impairment of the decoded signal which may be caused by the reduction in the number of bits of the index transmitted.

There are various conventional methods of constructing reference libraries for vector quantization processes, defined to model in an optimum way the form of the signal to be quantized. For example the LBG method is used to obtain, for different values of the integer Q, libraries of size $2^Q$ which minimise the root-mean-square error when quantifying a corpus of representative signals.

Figure 4:
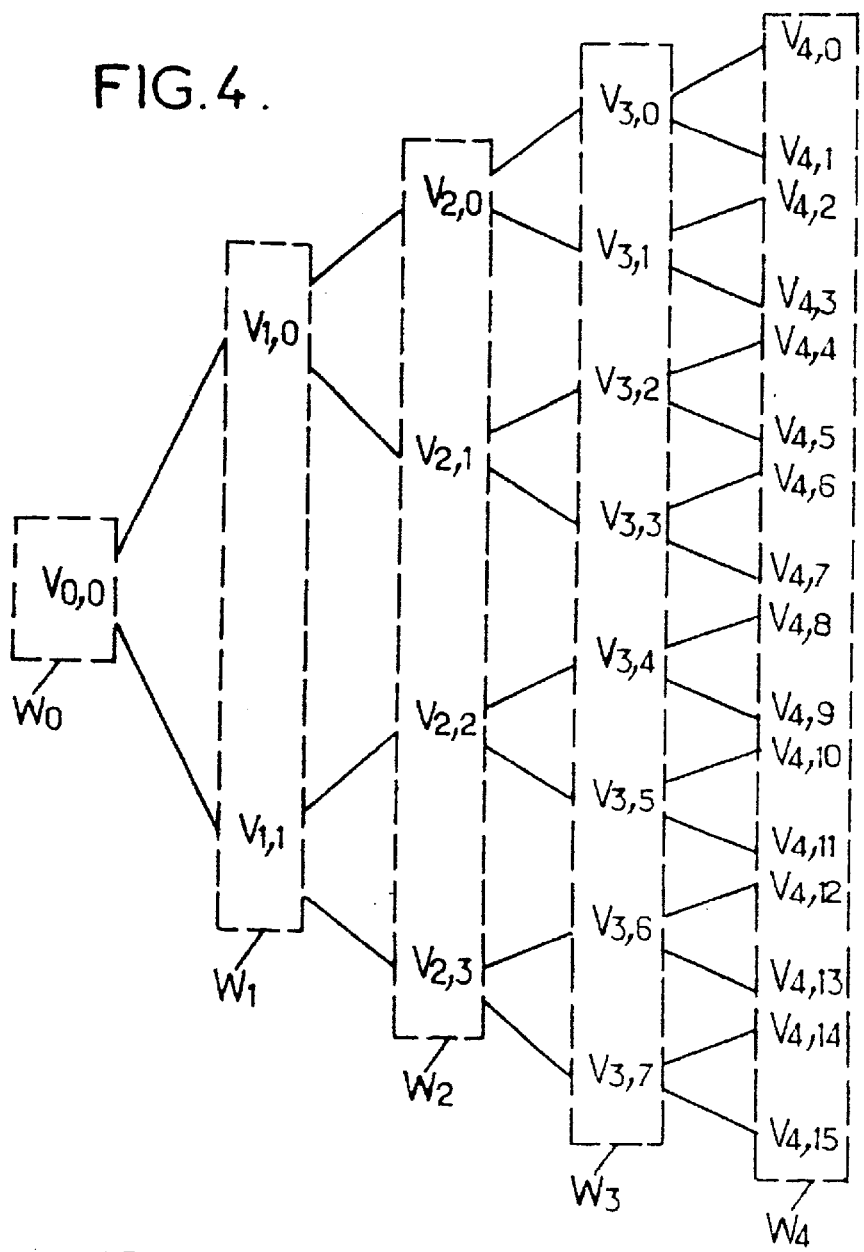
FIG. 4 is a diagram showing the construction of vector quantization libraries used in the processes according to the invention.

Libraries of this kind can be generated by a tree structure procedure illustrated in FIG. 4. This figure shows that the libraries Wi each composed of $2^i$ vectors $V_{ij}$ ($0 \leq j < 2^i$) generated iteratively on the basis of i=0 so that their linear combinations best cover the space of the signals to be quantified. For each value of $i_j$, the vectors $V_{j+1.2j}$ and $V_{j++1.2j+1}$ are derived from the parent vector $V_{ij}$ to which they are closest. Once Q iterations have been carried out, the library $W_Q$ is adopted as reference library and the j indices of the vectors $V_{Qj}$ as addresses. This known construction of libraries is generally used with the aim of speeding up the search for the optimum vector, by searching from the root to the branches of the tree, which makes it necessary for the coder to store at least part of the intermediate libraries $W_j$ (j<Q) in addition to the library $W_Q$. In this application, this construction is used to make sure that, for any value of p, the $2^P$ vectors designated by the addresses of the group of $2^P$ addresses sharing their Q-p most significant bits are relatively close to each other, which minimises the distortions caused by transmission of a limited number of bits of the index.

The decoding module DSn, DEn or DE0m receiving the Q-p bits of the truncated index can complete them by p bits of arbitrary values instead of the missing p bits to form the access address in the reference library.

If the spectrum of the quantized signal is blank, which is approximates well to the case with the residual error signals E0m and En, it then has one chance out of $2^P$ of using the optimum vector. To limit bias, it is preferable to draw at random the p bits added to the index received.

In some cases, the p bits added to the index received by the decoder may be of predetermined values, for example 00 . . . 0. This may be the case if the vector quantization module CSn, CEn or CE0m of the coder selects the coding parameter vector from a sub-library of $2^{Q-p}$ vectors included in the reference library, containing only the vectors having an address which ends in p zero bits. The Q-p bits of the index transmitted, completed by p zero least significant bits then represent the address of the vector selected from the reference library.

Another possibility for the decoding module DSn, DEn or DE0m of the decoder, receiving an index of Q-p bits only, is to calculate to form its output signal an average of the $2^p$ vectors having addresses which begin with these Q-p bits.

It the statistics of the quantization signal are uniform, it is desirable that this average should be uniform, i.e. not weighted.

If the statistics of the quantized signal are not uniform, which may be the case for example for the signals S1–SN in the coder in FIG. 1, weighting will preferably be used in the calculation of the average by the decoder. In this case, a database representative of the statistics of the signals processed is used beforehand to associate with each vector in the library a coefficient representing the theoretical probability of its occurrence. As these coefficients are fixed, it is then possible to use them to weight the averages so as to limit the distortions due to deletion of certain bits of the data stream.

To obtain the waveform, it is also possible for the decoder to adopt a method which takes account of information on the coded signal.

This information may in particular refer to the steady-state or non-steady state character of the signal. It may either be transmitted by the coder in the digital data stream, for example in the header H, or obtained by the decoder by an analysis after the event of the decoded signal. Methods of analysing the steady-state character of the signal, for example of voiced/unvoiced detection, are well known in the field of speech coding.

Several tables of weighting coefficients associated with the vectors in the reference library may be drawn up beforehand, for example one table representative of the statistics of signals of the steady-state type, and another table representative of the statistics of signals of the non-steady-state type, and a choice made dynamically of the table used to retrieve the coefficients for weighting the average on the basis of the information on the steady-state nature of the signal.

Where the vector is simply selected from the group of $2^P$ vectors, the selection may also be different depending on information on the signal such as the degree to which it is steady-state.

Another analysis which the decoding module may carry out in connection with retrieval of the coding parameter vector is based on predicting this vector. Thus the sequence of the vectors retrieved by the decoding module concerned for the successive time windows can be subjected to linear prediction in order to obtain a predicted vector for the current window. Two possibilities are then offered: to adopt the one of the $2^P$ vectors in the group having addresses which begin with the Q-p bits of the index received which shows maximum similarity with, or a minimum distance from, the predicted vector; or to take account of this predicted vector in assigning weighting coefficients if a weighted average calculation is carried out, a maximum weighting being then assigned to the one of the $2^P$ vectors which shows maximum similarity with the predicted vector.

The different methods which have been described above for obtaining the vector on the basis of the incomplete index may coexist in the same decoder, and be selected on the basis of information contained in the data stream or transmitted in a report prior to the communication. Moreover, as each vector is formed by a respective decoding module DSn, DEn or DE0m, provision can be made for different methods to be applied by these modules to obtain the vector on the basis of the incomplete index. Furthermore, the different coding and decoding modules associated could use different reference libraries.

Figure 5:
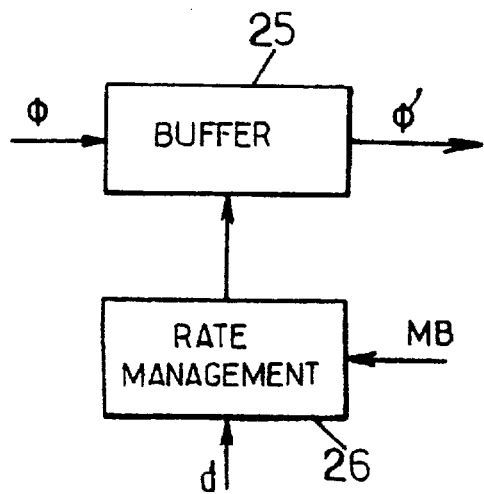
FIGS. 5 and 6 are schematic diagrams of examples of transcoders according to the invention.
Figure 6:
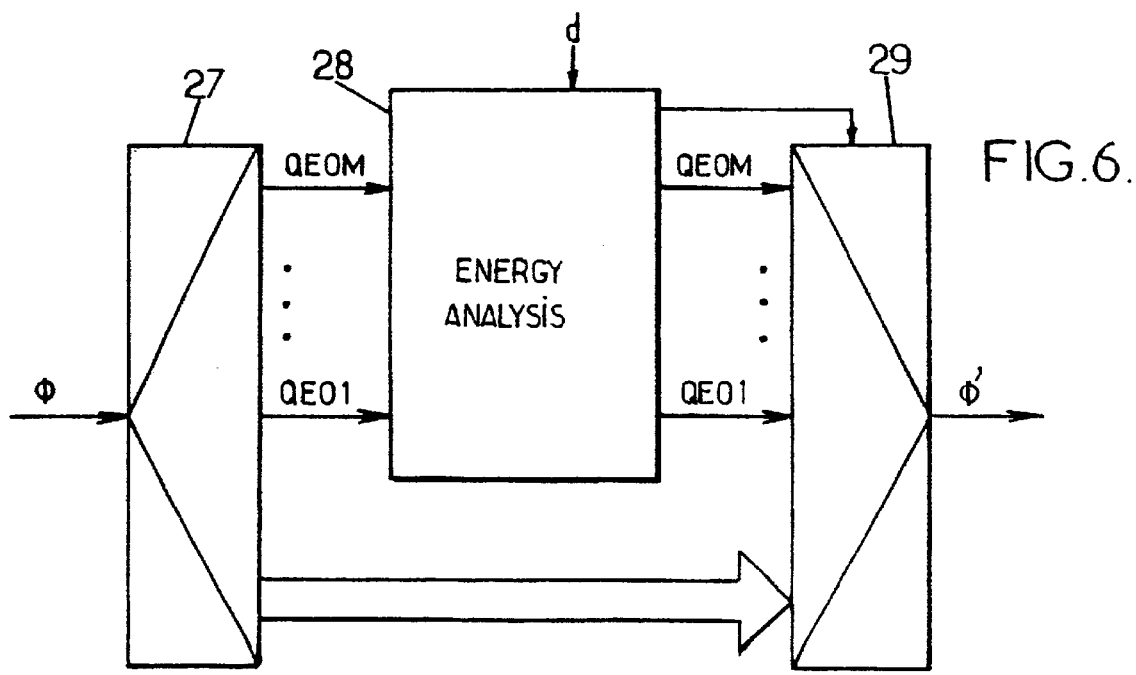

FIGS. 5 and 6 are block diagrams of transcoders which can delete certain bits of one or more indices.

It should be noted that the input data stream Φ of the transcoder may already have had the least significant bits of some of the vector quantization indices deleted, either by the coder at the origin of the data stream or by another intermediate transcoder. An index of Q−q bits of the input data stream Φ (with Q≧0 in the general case) is thus reduced to an index of Q−p bits, with p>Q, in the output data stream Φ' of the transcoder.

In the architecture of FIG. 5, the input digital data stream Φ is written to a buffer memory 25. Parts of this are then read into the memory 25 to form the output date stream Φ'. Monitoring of the bits read and deleted is carried out by a rate management unit 26 receiving an output rate value d to be complied with. As a function of the rate d, the unit 26 determines which bits are to be deleted. As an example, for decreasing values of d, it may begin by deleting one bit per coding module, starting, depending on the composition of the input data stream Φ, with the last stages of the coder and the highest sub-bands. Of course, other strategies for choosing the deleted bits would be applicable. As shown in FIG. 5, the transcoder could also receive messages MB from the receiver in order to take account of this in the construction of the output data stream Φ'.

In the architecture in FIG. 6, the transcoder comprises an input demultiplexer 27 which receives the input data stream Φ and separates certain vector quantization indices (indices QE0m only in the example in the drawing) from the rest of the data stream. An energy analysis unit 28 examines the indices QE0m and deletes certain bits of these before supplying the truncated indices to an output multiplexer 29 which, with the other elements of the input data stream Φ, forms the output data stream Φ'.

For each set of indices QE0m=(GG, GR, IF, σ), the unit 28 estimates the energy of the quantized signal, measured by the indices of gains when the waveforms are standardised. Depending on the output rate d required, it deletes bits of the vector quantization indices IF of the waveforms, starting with those belonging to the sets of indices for which the estimated energies are lowest. Thus, from the array of spectral components, one or more components having energies which are minimum are selected in order to replace the index IF of the vector quantization indices associated with each components selected by a truncated index.

It will be noted that the coder could adopt a strategy of this kind from the outset.

A decoder receiving the output data stream Φ' constructed in this way estimates the energies on the basis of the gain indices (which are not changed) in the same way, which enables it to identify the sub-bands for which bits of the indices IF have been deleted. The input demultiplexer 15 of this decoder is associated with an energy analysis unit of the same kind as the unit 28 in FIG. 6. The energy analysis unit of the decoder, which may be part of the bit allocation unit in the diagram in FIG. 2, receives the gain indices GG, GR, σ for the different quantized components in order to identify the components with least energy and assign a reduced number of bits to their vector quantization indices of form IF. It controls the input demultiplexer 15 and the decoding modules DSn, DEn, DE0m so that the bits of the indices are suitably distributed. For the decoder to be able correctly to identify the indices received, it is necessary to change the ordering of the bits in the data stream compared with the structure shown in FIG. 3, for example so as to place the gain indices GG, GR, σ before the form indices IF.

This method of operating coding/transcoding and decoding directs the errors towards the portions of the signal with the least energy, which limits perception of the distortions.

The transcoder in FIG. 5 or 6 can in particular be placed at a node in a telecommunications network used to transmit the digital data stream. The input digital data stream Φ is then received on a link of the network, and the output digital data stream Φ is retransmitted on another link of the same network, or a link of a different network in the case of a bridge. The network in question may in particular be a packet switching network, such as an Internet or ATM network. In a network of this kind, it is desirable to be able to match dynamically, and preferably with fine adjustment, the transmission rate to avoid transmission delays due to congested traffic, delays which are generally not acceptable for audio signals.

In certain applications, the transcoding may also be located at the place from which the coded signal originates. It may in particular be associated with an audio server, as shown schematically in FIG. 7 or 8.

Figure 7:
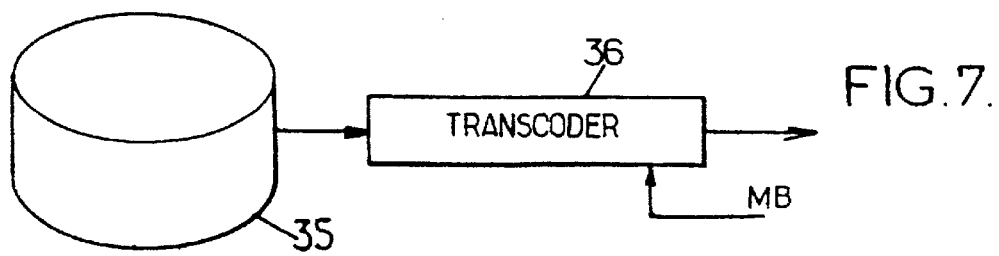
FIGS. 7 and 8 are two schematics showing the application of the present invention in an audio server.

In the example in FIG. 7, a memory 35 of the audio server contains a number of signal sequences coded beforehand at the maximum rate of the coding process (in the example considered above: NE01= . . . =NE0M=NS1= . . . NSN= NE1= . . . =NSN=NE1= . . . =NEN=56).

When the server is to produce a given sequence intended for a decoder, having for example announced its relevant characteristics in a message MB (and/or indicated the sub-bands for which bits can be deleted), the transcoder 36 obtains the full rate data stream read from the memory 35 and, to transmit at a lower rate, deletes quantization bits determined as described previously.

Figure 8:
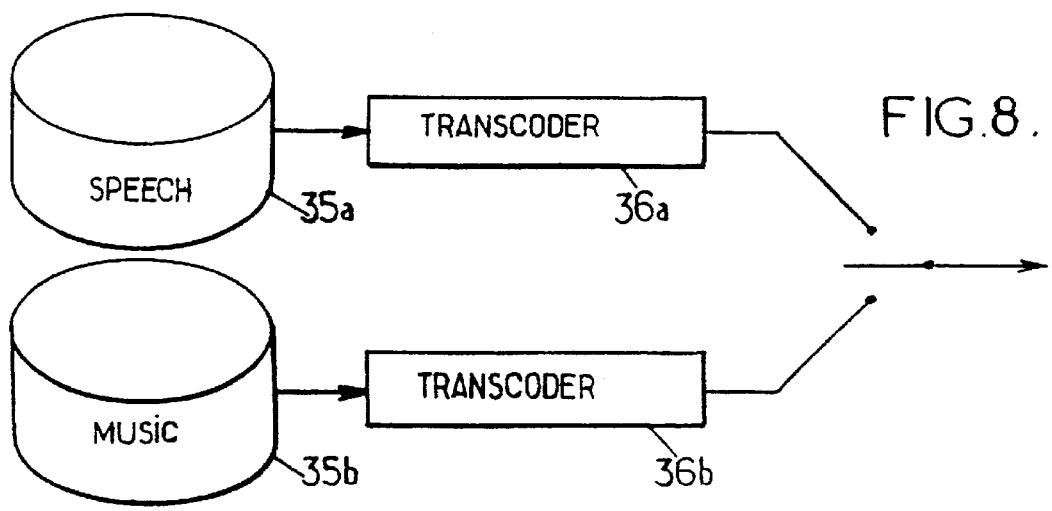

The bits deleted may also be chosen as a function of the origin of the coded signal. Thus FIG. 8 shows another audio server in which transcoders employ the invention without necessarily analysing the data streams transmitted or receiving messages MB from a decoder. In the example in FIG. 8, the server memory is divided into two areas, one 35a in which the sequences coded at full rate corresponding to speech signals have been recorded, and the other 35b in which the sequences coded at full rate corresponding to music signals have been recorded. Each sequence read from zone 35a is submitted to a transcoder 36a which reduces its rate when necessary, by giving priority to deletion of bits relating to the sub-bands from separation of the error signal E0. Conversely, the sequences read from zone 35b are submitted to a transcoder 36b which, when necessary, deletes quantization bits preferentially in the high bands in order to give priority to the correction of distortions which the coding core may have introduced into the base band.

The coding or transcoding procedure according to which a number of bits Q−p smaller than the number of bits Q of the addresses of the vectors in the reference library are transmitted, may also be applied to the coder core, or more generally to any waveform coder using a library, for example CELP or other. These coders are developed in connection with applications in which this invention is not normally taken into account. This leads to reference libraries with an ordering which does not necessarily fulfill the condition of small distances between vectors having addresses which share their most significant bits.

Starting from a reference library of this kind of size $24^Q$, we may order the vectors which compose it so as to associate with them respective indices of Q bits in addition to their addresses in the library, leading to verification of a minimum distance criterion between the vectors belonging to each group of $2^p$ vectors of the library having indices of Q respective bits which differ only in the p least significant bits. This ordering can be carried out for only one or for several values of the integer p. It leads to the definition of one or more transcoding relations or tables determining an index of Q bits to represent the address on Q bits of each vector in the library. This table is such that the vectors of each group of $2^p$ vectors, having addresses which are represented by $2^p$ indices of Q bits differing from each other only by their p least significant bits, are relatively close to each other.

The above considerations, relating to the reduction in the number of bits for one or more vector quantization indices, is applicable to a configuration of codec whose principle is illustrated in FIGS. 1 and 2, and in a similar manner can be applied to any codec configuration which generate one or more parameters which are quantized vectorially. Considering only audio coders, one can mention systems in which the gains, the waveforms and/or the frequency components of the signal are quantized vectorially. The process is thus applicable to CELP codecs and derivatives, MP-LPC (Multi Pulse-Linear Prediction Coding), for sub-bands, MBE (Multi Band Excited), etc. It is also applicable to the coding of other types of signal, notably video.

In other transcoding configurations, sets of vector quantization indices relative to one or more spectral components are completely suppressed, but not necessarily those associated with the highest sub-bands. The suppression of one or another sub-band can thus be favoured depending on the origin or nature of the signal and/or the capabilities of the decoder.

Figure 9:
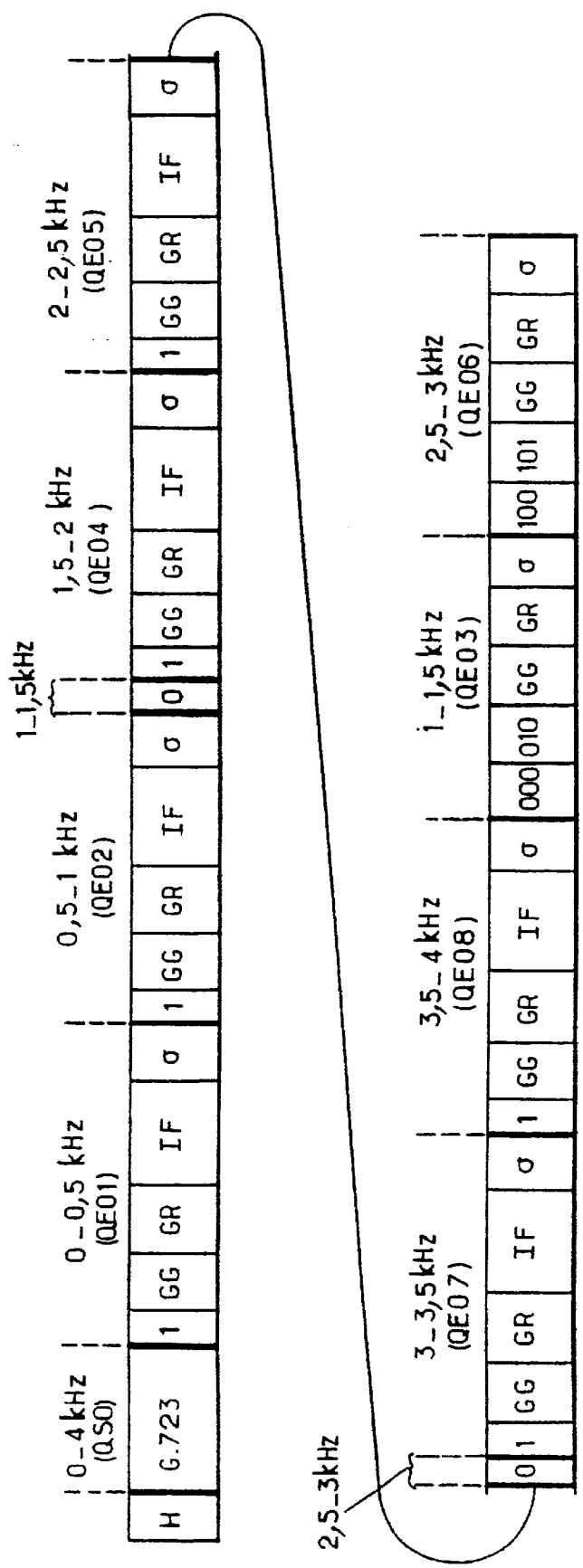
FIG. 9 is a diagram showing another example of a data stream structure which could be produced by a coder according to the invention.

FIG. 9 illustrates another judicious way of reducing the codec bit rate already described. In this example, the data stream does not carry waveform quantization indices IF for the sub-bands m=3 and m=6. It does however carry gain quantification indices GG, GR and σ for these two M sub-bands, called receiver bands, and the decoder receives the instruction to copy the corresponding waveform quantization indices from other sub-bands m', called donator bands (m'=1 and m'=5, respectively). In the data stream configured according to the method indicated in FIG. 3, the bits assigned to the two receiver bands m=3 and m=6 are set to 0, and the information corresponding to the last sub-band M=8 is followed by two fields which allow the decoder to reconstruct the components corresponding to the two receiver bands.

The data stream header should include information (for example, 2 bits) indicating the number of sub-bands which will be subject to this process of index copying. The field relevant to such a receiver sub-band m includes, apart from the gain quantization indices GG, GR and σ, two sub-band indices (coded on three bits in the present case where M=8). The first of these two indices denotes the number m' of the donator sub-band whose waveform indices IF will be copied; this could be, for example, the binary expression for (m'−1). Similarly, the second of these two indices denotes the number m of the receiver sub-band in question.

In the specific example of FIG. 9, two pairs of donator/receiver sub-bands have been determined, that is the pair m'=1, m=3 on the one hand, and the pair m'=5, m=6 on the other. For the donator sub-bands m' in each pair, the decoder reads the entire vector quantization indices directly from the digital data stream, while for the receiver sub-bands m, the decoder only reads directly the gain quantization indices and copies the waveform quantization indices IF from those read for the donator sub-bands m' of the pair. This operation is carved out by an appropriate instruction to the multiplexer 15 in FIG. 2.

The determination of these sub-band pairs m', m can be performed either by the coder generating the data stream, or by the intermediate transcoder. It results from an analysis of the correlations between the components E0m of the error signal E0, this analysis being carried out either directly on the components E0m or on their quantized form.

Figure 10:
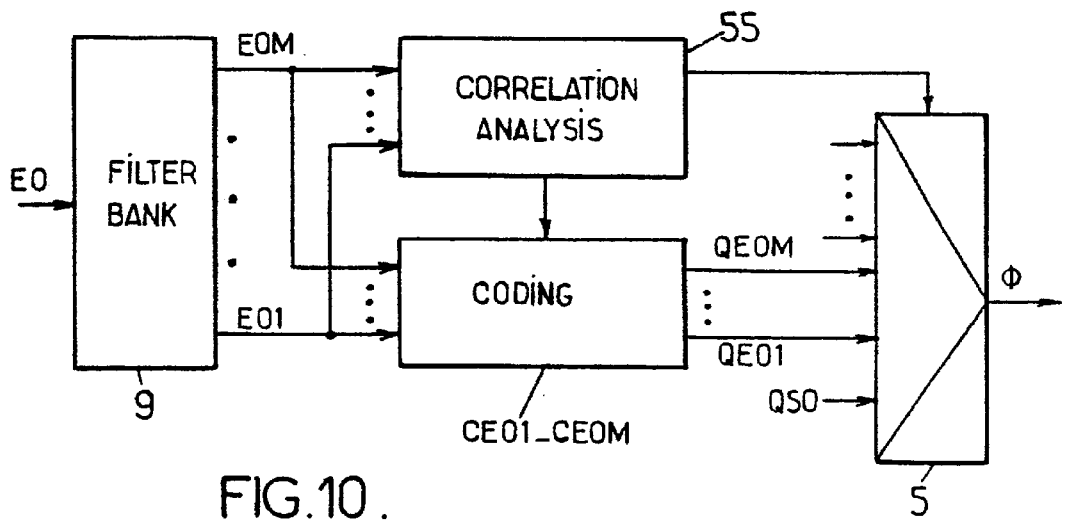
FIG. 10 shows a variant of the coder of FIG. 1.

FIG. 10 illustrates schematically how the coder depicted to FIG. 1 can be adapted to carry out the process of copying waveform quantization indices. The sub-band components E0m of the error signal E0, produced by filter bank 9, are analysed by a module 55 which calculates the correlations between them.

For the correlation between two components E0m and E0m', module 55 calculates, for example, the cosine or the cosine squared of the angle between the two vectors formed by successive digital sampling of the two components. This cosine is expressed as:

$$\cos(E0m, E0m') = \frac{E0m \times E0m'}{\|E0m\| \times \|E0m'\|} \quad (1)$$

where $$E0m \times E0m' = \sum_{t=1}^{T} E0m(t) \times E0m'(t) \{\text{scalar product}\}, \|x\| = \sqrt{xx},$$

and E0m(t) denotes the t-th sample of the component E0m, the calculation being carried out over a window of T=60 samples. The M(M−1)/2 correlations are arranged in a table soiled by decreasing correlations. The analysis module 55 then selects the pairs (two in this example) which have maximum correlation. In order to limit distortions, we arrange things such that a sub-band that is a receiver in one selected pair cannot appear in any other pair selected.

Starting with the selected pairs of sub-bands m'; m, module 55 sends a command to the coding module CE0m to force it to adopt the waveforms respectively selected by module CE0m' for each segment of the window. The module CE0m thus determines the appropriate gain indices GG, GR, σ so as to minimise the quantization error. Module 55 also commands the output multiplexer 5 so that it will construct the data stream (□) as shown in FIG. 9.

Figure 11:
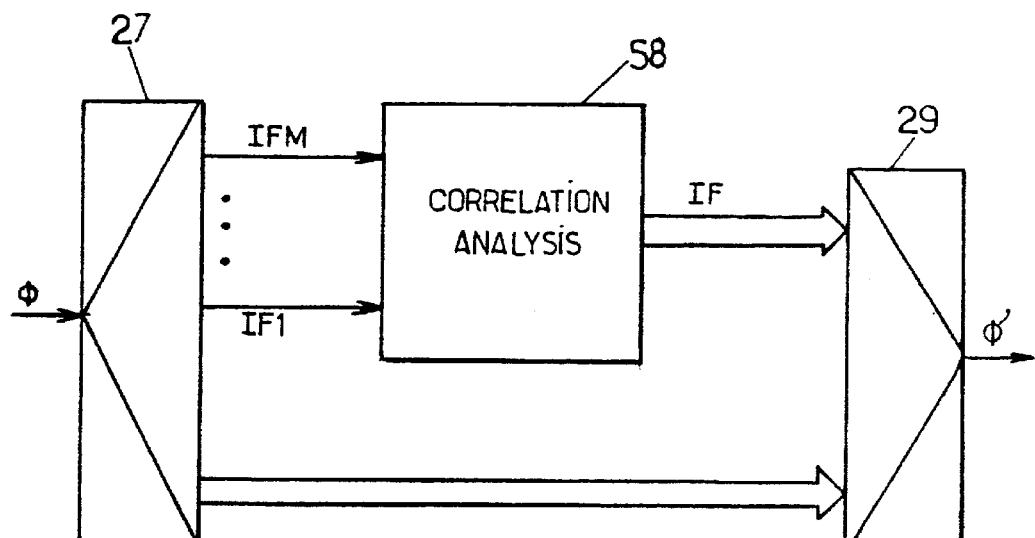
FIG. 11 is a schematic diagram of an example of a transcoder employing the invention.

This correlation analysis could be applied to the quantized waveforms rather than the components E0m themselves. The intermediate transcoder, as well as the coder, can be designed to process the signal in this manner as shown in FIG. 11. The waveforms stored in the libraries of the coding modules CE0m are already normalised, so that in the analysis of the correlations between quantified waveforms one can dispense with the calculations necessary for normalising the correlations (the denominator is not needed in equation (1) above).

Referring to the transcoder in FIG. 11, the demultiplexer 27 extracts from the input data stream Φ the waveform quantization indices IF1–IFM, corresponding to the M=8 decomposition sub-bands of the error signal E0 and to different segments of the window, and supplies them to the correlation analyser module 58. This module extracts from the quantization library the values of the waveforms pertinent to the window concerned, and proceeds with an analysis similar to that performed by module 55 previously described with reference to FIG. 10. In this analysis, components E0m output from filter bank 9, which are not available, are replaced by waveforms corresponding to the four segments. The remaining waveform indices are supplied to multiplexer 29, which generates the output data stream Φ' with lower bit rate, as well as the control parameters identifying the selected pairs m, m' and dictating the form of data stream Φ' as described with reference to FIG. 9.

The data stream represented in FIG. 9, which could be generated by the coder shown in FIG. 10 or by the transcoder shown in FIG. 11 consists of 773 bits, with digital values discussed above, per 60 ms window, or a bit rate of 12.9 kbits/s. This reduction in bit rate is achieved without sacrificing a priori two sub-bands, but, on the contrary, by exploiting the correlations that can exist between different sub-bands. The loss of quality which inevitably accompanies a reduction in data rate is thus minimised.

In the examples described with reference to FIGS. 10 and 11, it is the correlation analysis that is used to decide which sub-bands are selected for the index copying process. In practice, other correlation criteria between vectors could also be used, such as, for example, criteria based on minimum distance.

In the above-described examples, the process of copying indices is carried out by the decoder based on information read from the input digital data stream of the decoder (the bits in the header indicating the number of sub-bands concerned, the indices of the donator and receiver sub-bands). In other configurations, the process of index copying is effected without the input data carrying such information. This is notably the case where the decoder receives a variable rate input data stream Φ. In this case, the process consists of two phases:

a first phase in which the digital data rate is relatively high (it includes, for example, the M=8 components in error signal sub-bands). In this phase, module 60 in the decoder (see FIG. 12) receives the vector quantization indices QE0m corresponding to different sub-bands and analyses the correlations between different components of the sub-bands in a similar fashion to transcoder analysis module 58 in FIG. 11. In this phase, module 60 does not modify the parameters QE0m received; it delivers them respectively to decoding modules DE0m which generate the components E'0m used in the reconstruction of estimation E'0 of the error signal;

a second phase in which the data rate of stream Φ is reduced by suppression of one or more of the higher sub-bands of the error signal. Such a suppression could, for example, occur in the transmission network of the data stream, in order to facilitate the transmission of the data during a heavy traffic load. In this phase, module 60 exploits the correlations acquired in the first phase to effect copying of the indices. If, for example, the vector quantization indices relative to the sub-band M=8 are missing, module 60 looks for the components of other sub-bands that exhibit the maximum correlation with this M-th component in the first phase, and the waveform quantization indices will be copied from the set of indices QE0m received for this sub-band. The gain quantization indices can also be copied following the same process, and they could be multiplied by a coefficient also acquired during the first phase.

If the decoder is capable of exchanging messages with the transcoder which effects the reduction in data rate, it can then be seen that, when a reduction in data transmission rate becomes necessary, the analysis module 60 in the decoder identifies, in a message MB returned to the transcoder, which are the sub-bands for which part or all of the indices can be preferentially suppressed. The transcoder can then suppress waveform indices relative to these sub-bands. In the second phase where the data rate is lower, decoder module 60 will copy these indices from the sub-bands for which it will have measured the maximum correlations in the first phase. If the gain quantization indices are also suppressed by the transcoder, module 60 in the decoder can re-evaluate them as described previously.

Figure 13:
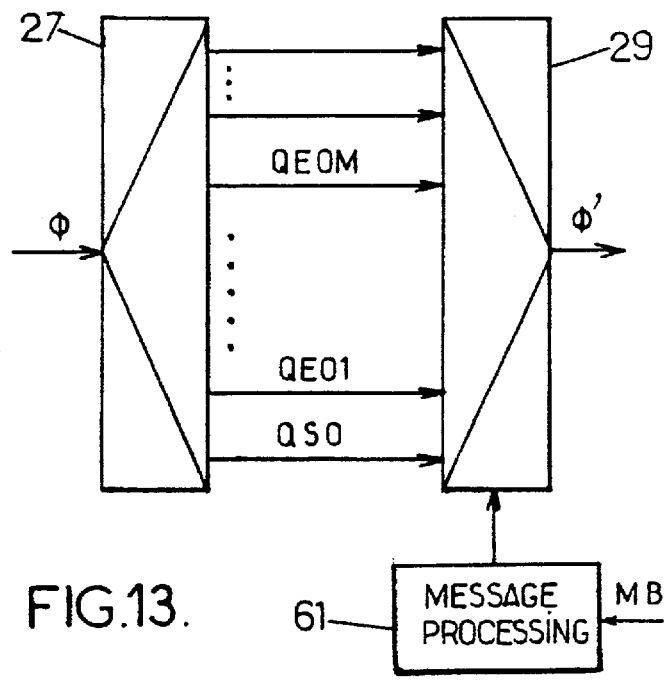
FIG. 13 is a schematic diagram of another example of a transcoder using the invention.

FIG. 13 is a schematic diagram of a transcoder co-operating with this type of decoder. This transcoder contains a message processing unit 61 for messages received from the decoder. Unit 61 instructs the transcoder output multiplexer 29 to suppress, from the output data stream Φ', certain of the vector quantization indices extracted from the input data stream Φ by the demultiplexer 27, and to generate the output data stream, for example following the scenario described with reference to FIG. 9. The direct analysis of the input data stream (FIG. 11) is thus replaced by the message processing resulting from an analysis carried out downstream by the decoder. The indices suppressed will typically be waveform indices for one or more of the sub-bands. They might also include certain gain quantization indices, for example the residual gain quantization index GR.

Figure 12:
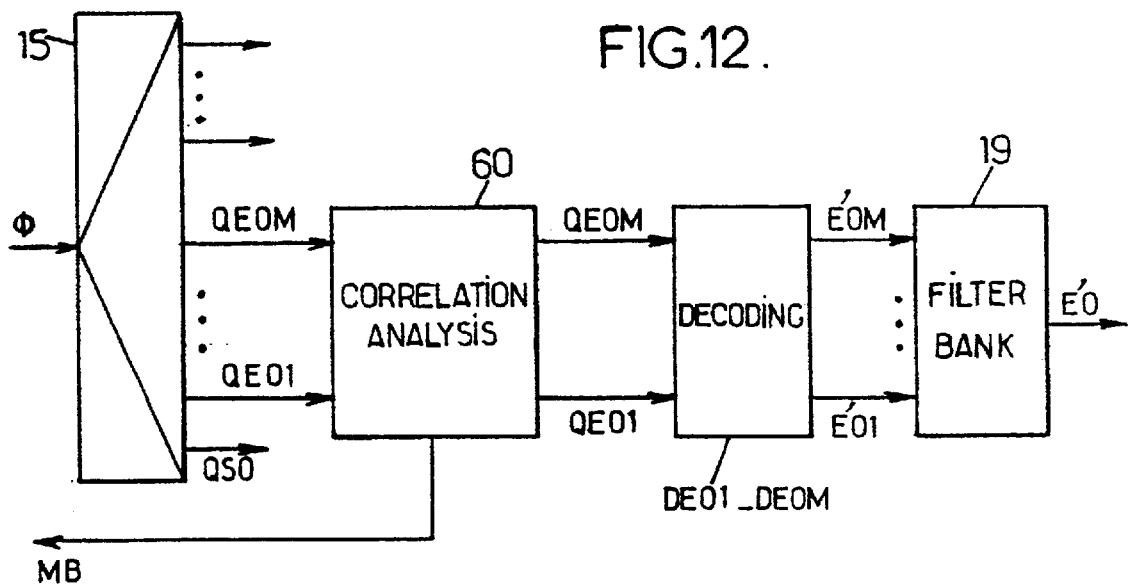
FIG. 12 is a schematic diagram of an example of a decoder usign the invention.

In other configurations, the messages MB returned by the decoder do not contain the results of an analysis such as that performed by decoder module 60 in FIG. 12, but rather information indicating the characteristics of the decoder. For example, if the decoder is designed to decode only voice signals, it can inform the transcoder of this in the MB message, so that the latter can preferentially eliminate vector quantization indices relating to the error signal E0 sub-bands (or only certain of these indices, or even certain bits only of these indices) rather than those relating to the high frequency bands from the decomposition of input signal S. In this case, the decoder controls the transcoder such that it does not simply eliminate the last few bits in the data stream, but preferably more appropriate bits situated in intermediate positions.

Since the voice signal is faithfully coded at a low data rate by the central coder 8, the improvement made by coding the higher frequency band components is much more significant than that made by coding the error signal components, such that this leads to an optimal way of transcoding of the voice signal considering the constraints on data rare.

Another configuration for the transcoding process consists of an analysis of the input data stream Φ, not for finding correlations between sub-bands as is described above with reference to FIG. 11, but for determining which of the sub-bands has the coded signal (for example, the error signal E0) with the least energy. In this case, the suppression of vector quantization indices is effected preferentially in these least energetic sub-bands. The transcoder can form the output data stream Φ' by suppressing one part only of the indices for a low energy sub-band. It could also suppress the whole of the indices for one or more sub-bands with very low energy.

One simple way of determining which are the lowest energy sub-bands consists of examining the gain quantization indices. These gains are indicative of the energy since the library waveforms are normalized. The transcoder determines, from among the M=8 sub-bands, that or those whose gains are the lowest over the four segments, and then favours the suppression of these indices for that or those sub-bands. For this determination, the transcoder, conforming to the configuration in FIG. 6, only has to examine the average gain quantization indices GG over the window.

In the various configurations for the transcoding process described above, indices, or certain bits only of these indices, of the input stream Φ are suppressed in order to generate an output data stream Φ' at a lower bit rate, where the choice of bits to be eliminated is not arbitrary (these bits appear last in each window), but is dictated by rules which minimise the degradation of the coding quality. These dispositions allow for a high precision in the digital data stream sampling, while limiting the degradation that would necessarily result in a reduction in quality, as well as the increase in complexity of the transcoding modules that is unavoidable.

What is claimed is:

1. Method for decoding a digital data stream representing an audio signal, in which at least a group of spectral components is calculated from the vector quantization indices included in the digital data stream, and where the spectral components of the said group are combined during the construction of a decoded version of the audio signal, each component of the group being associated with a set of vector quantization indices used in the calculation of this component, in which the digital data stream includes identification information for at least one pair of spectral components, each identified pair comprising a first and a second component, and where the second spectral component of at least one identified pair is associated with a set of vector quantization indices of which at least some are copied from a set of indices read from the data stream and associated with the first spectral component of the said identified pair.

2. A decoding method according to claim 1, in which the spectral components of the group are processed by successive time segments, each time segment of a spectral component being determined by the product of a waveform belonging to a library and a gain, the said waveform and the said gain being identified by respective vector quantization indices belonging to an associated set of indices, and where the vector quantization indices copied for a spectral component comprise the waveform quantization indices corresponding to this spectral component.

3. A decoding method according to claim 2, in which at least a part of the gain quantification indices belonging to the set of indices associated with the second component of each identified pair is read from the digital data stream in a manner independent of the reading of the set of indices associated with the first component of the said pair.

4. A method for decoding a digital data stream representing an audio signal, in which at least one group of spectral components is calculated from the vector quantization indices included in the data stream, and the spectral components of the said group are combined during the construction of a decoded version of the audio signal, each component of the group being associated with a set of vector quantization indices used in the calculation of this component, in which the data stream has a variable rate, the method comprising a first phase in which the data stream includes sets of respective vector quantization indices for calculating a first group of spectral components and in which the correlations between spectral components of the first group are analysed, and a second phase, in which the digital data stream of lower frequency than in the first phase includes sets of vector quantization indices for calculating only a part of the spectral components of the first group, and in which at least one spectral component of the first group not belonging to the said part is calculated from the indices at least partially copied from a set of vector quantization indices read from the data stream and associated with a component belonging to the said part, for which a maximum correlation was determined in the first phase.

5. A decoding method according to claim 4, in which the spectral components of the group are processed by successive time segments, each time segment of a spectral component being determined by the product of a waveform belonging to a library and a gain, the said waveform and the said gain being identified by respective vector quantization indices belonging to an associated set of indices, and where the vector quantization indices copied for a spectral component comprise the waveform quantization indices corresponding to this spectral component.

6. A decoding method according to claim 5, in which the analysis of the correlations between spectral components of the first group in the first phase is applied to the waveform quantization indices.

7. Method for coding an audio signal, in which at least one group of spectral components is obtained from the audio signal, and the digital output data stream is produced including vector quantization indices for at least some of the spectral components, wherein at least one pair of components exhibiting a maximum correlation out of the group of spectral components is selected, and wherein an identification code is included in the output data stream for each pair of components selected, and wherein at least some of the vector quantization indices are included in the digital output stream for only one of the components of each pair selected.

8. A coding method according to claim 7, in which the group of spectral components is produced by a decomposition of the audio signal into sub-bands.

9. A coding method according to claim 7, in which the group of spectral components is produced by a decomposition of the residual error signal, generated by a first stage of audio signal coding, into sub-bands.

10. A coding method according to claim 7, in which the spectral components of the group are processed by successive time segments, each spectral component time segment being represented by the product of waveform belonging to a library and a gain, and in which the vector quantization indices that are included in the output data stream for only one of the components of each pair selected comprise indices identifying the waveforms relative to the components of the said pair.

11. A coding method according to claim 9 or 10, in which the selection of at least one pair of components exhibiting a maximum correlation is effected by groups of several consecutive time segments.

12. A coding method according to claim 10, in which, for both components of each pair selected, the gain quantization indices are calculated and included, at least in part, in the digital output data stream.

13. Method for transcoding of a digital input data stream representing an audio signal coded by successive time windows, to generate a digital output data stream of lower data rate, in which the formation of the output stream comprises, for a signal window represented by a number of ordered input bits, A, the copying of a number of input bits, A–B, and the suppression of a number of bits, B, from the input stream in order to reduce the data rate, and where the bits to be suppressed from the input stream are determined by information received from a decoder to which the output data stream will be routed.

14. Method for transcoding according to claim 13, in which the digital input data stream includes sets of vector quantization indices associated, respectively, with a group of spectral components, in which at least one pair of components exhibiting a maximum correlation out of the group of spectral components is selected, and in which the set of vector quantization indices associated with one of the components of each pair selected is retained in the digital output stream, while at least some of the indices of the set of vector quantization indices associated with the other component of each pair selected are eliminated.

15. Transcoding method according to claim 14, in which each signal window is composed of one or more successive time segments, each spectral component time segment being represented by the product of waveform belonging to a library and a gain, each set of vector quantization indices associated with a component of the group comprising, on the one hand indices identifying the waveforms, and on the other indices identifying the corresponding gains, and in which the vector quantization indices which are suppressed from the output data stream for only one of the components of each pair selected comprises indices identifying the waveforms relative to the components of the said pair.

16. Transcoding method according to claim 15, in which the indices respectively identifying the gains relative to the two components of a pair selected are conserved in the digital output data stream.

17. Transcoding method according to claim 14, in which identification information for each pair of spectral components selected is included in the output data stream.

18. Transcoding method according to claim 14, in which the selection of a pair of components exhibiting a maximum correlation out of the group of spectral components is carried out based on information received from the decoder to which the digital output stream is routed.

19. Transcoding method according to claim 13, in which the digital input data stream includes sets of vector quantization indices associated with a group of spectral components, respectively, and in which the bits eliminated comprise at least one set of vector quantization indices associated with a spectral component.

20. Transcoding method according to claim 19, in which the spectral component(s) associated with suppressed vector quantization indices are chosen depending on the origin of the coded audio signal.

21. Transcoding method according to claim 19, in which the spectral component(s) associated with suppressed vector quantization indices are chosen depending on the characteristics of the decoder to which the output binary data stream is directed.

22. Transcoding method according to claim 13, in which the digital input data stream includes, for each signal window, at least one index which points to a coding parameter vector in a reference library containing $2^Q$ vectors, which can be used to construct a decoded version of the signal, in which the said index included in the input data stream is composed of Q−q bits which, when completed by q arbitrary bits in predetermined positions, define a group of $2^q$ vector addresses in the reference library, q being an integer such that q>0, and in which the index of Q−q bits is replaced by a translated index of Q−p bits in the output stream, which, when completed by p arbitrary bits in predetermined positions, define a group of $2^p$ addresses including the said group of $2^q$ addresses, p being an integer such that q<p<Q.

23. Transcoding method according to claim 22, in which the reference library is ordered in such a way as to verify a criterion of minimum distance between vectors belonging to each group of $2^p$ reference library vectors whose respective addresses only differ by the p bits having the predetermined positions.

24. Transcoding method according to claim 22, in which the digital input stream includes sets of vector quantization indices associated with a group of spectral components, respectively, and in which each set of indices associated with a component of the group consists of at least one index which can be translated by reduction of its number of bits and which points to a coding parameter vector.

25. Transcoding method according to claim 13, in which the digital input data stream is read from the memory of an audio server.

26. Transcoding method according to claim 13, in which the digital input data stream is received via a telecommunications network link and the digital output data stream is retransmitted via another link in the network or via a link in another network.

27. Audio decoder comprising signal processing means employing a decoding method according to claim 1.

28. Audio coder comprising means for producing at least one group of spectral components from an audio signal, means for calculating the vector quantization indices for at least some of the spectral components of the group, and a multiplexer to generate an output data stream including at least some of the calculated vector quantization indices, wherein the audio coder comprises, in addition, means of analysis for selecting at least one pair of components exhibiting a maximum correlation out of the group of spectral components, the multiplexer being controlled to include identification information for each pair of components selected in the output data stream, and so that at least some of the vector quantization indices be included in the output data stream for only one of the components of each pair selected.

29. Audio coder according to claim 28, in which the means for producing the group of spectral components from the audio signal comprises a bank of filters for the decomposition of the audio signal into sub-bands.

30. Audio coder according to claim 28, in which the means for producing the group of spectral components from the audio signal comprises a first stage for coding the audio signal, and a bank of filters for the decomposition of the residual error signal, produced by the first coding stage, into sub-bands.

31. Transcoder comprising means for signal processing employing a transcoding method according to claim 13.

* * * * *